United States Patent
Faulkner et al.

(12) 
(10) Patent No.: US 6,409,978 B1
(45) Date of Patent: *Jun. 25, 2002

(54) METHOD OF REMOVING IMPURITIES FROM MINERAL CONCENTRATES

(75) Inventors: Bobby P. Faulkner, New Berlin; John M. Paustian, Milwaukee, both of WI (US)

(73) Assignee: Svedala Industries, Inc., Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/615,212

(22) Filed: Jul. 13, 2000

Related U.S. Application Data

(63) Continuation-in-part of application No. 09/053,184, filed on Apr. 1, 1998, now Pat. No. 6,090,353.

(51) Int. Cl.$^7$ .................. C01B 25/10; C01B 25/26; C01B 33/20; C01B 33/26; C01B 33/12
(52) U.S. Cl. .............. 423/1; 423/301; 423/305; 423/307; 423/308; 423/311; 423/326; 423/327.1; 423/328.1; 423/328.2; 423/335; 423/340; 423/490; 423/605; 423/87; 423/89; 423/98; 423/49; 423/150.1; 423/155; 423/157.2; 423/179; 423/202; 423/47; 423/300
(58) Field of Search ................ 423/46, 47, 87, 423/89, 98, 49, 1, 335, 340, 490, 327.1, 328.1, 328.2, 300, 301, 305, 307, 308, 311, 326, 605, 155, 157.2, 150.1, 179, 202

(56) References Cited

U.S. PATENT DOCUMENTS

| | | |
|---|---|---|
| 412,300 A | 10/1889 | Selwyn |
| 604,167 A | 5/1898 | Currie et al. |
| 723,787 A | 3/1903 | Trivick |
| 824,663 A | 6/1906 | Koehler |
| 841,328 A | 1/1907 | Lander |
| 913,535 A | 2/1909 | Moore |
| 1,103,258 A | 7/1914 | Brackelsberg |
| 1,124,519 A | 1/1915 | Ramen et al. |
| 2,681,855 A | 6/1954 | Holmberg .............. 75/113 |
| 2,756,136 A | 7/1956 | Queneau ................ 75/5 |
| 2,805,120 A | 9/1957 | Plant ................... 23/87 |
| 3,318,685 A | 5/1967 | Handwerk ............... 75/3 |
| 3,482,964 A | 12/1969 | Ishimitsu ............... 75/5 |
| 4,259,106 A | 3/1981 | Aaltonen et al. ........ 75/7 |
| 4,410,496 A | 10/1983 | Smyres et al. .......... 423/1 |
| 4,612,171 A | 9/1986 | Holmström ............ 423/22 |
| 4,642,133 A | 2/1987 | Mäkinen et al. ........ 75/2 |
| 4,983,370 A | 1/1991 | Loritsch et al. ........ 423/340 |
| 5,612,008 A | 3/1997 | Kirk et al. ............. 423/60 |
| 6,090,353 A | * 7/2000 | Faulkner et al. |

FOREIGN PATENT DOCUMENTS

DE 160967 7/1984

* cited by examiner

*Primary Examiner*—Steven Bos
(74) *Attorney, Agent, or Firm*—Andrus, Sceales, Starke & Sawall, LLP

(57) ABSTRACT

A process for removing impurities contained in the crystal lattice of minerals, comprising the steps of forming a mixture of a mineral capable of structurally reorganizing its crystal lattice which contains an impurity in its crystal lattice and a halogen anion, and water; heating the mixture to the mineral's structural reorganization transition temperature; holding the mixture at the structural reorganization transition temperature for a sufficient period of time to allow the impurity to freely migrate from the lattice to combine with the halogen anion; and separating the combined impurity and anion from the mixture to render the mineral essentially free of the impurity. The process is applicable to numerous minerals and impurities, but is especially useful to remove arsenic from fluorspar. Numerous halogen anions can be employed, such as chlorides, fluorides, bromides and iodides, but the preferred halogen anion is a metal chloride such as calcium chloride. Various matrix-forming additives may also be employed with the mixture to provide a receptor which immobilizes the impurity. Preferred additives are silicates, added in the form of bentonite, or other clays as well as organic compounds such as lignosulfonates, starches and starch hydrolyzates.

22 Claims, 4 Drawing Sheets

METHOD OF REMOVING IMPURITIES FROM MINERAL CONCENTRATES

CROSS-REFERENCE TO RELATED APPLICATIONS

This application is a continuation-in-part of Application No. 09/053,184 filed Apr. 1, 1998, now U.S. Pat. No. 6,090,353.

BACKGROUND OF THE INVENTION

The present invention relates to a process for removing impurities from minerals, and more particularly to a process for removing impurities contained in the crystal lattice of minerals.

It is well known that impurities, whether they be desirable or undesirable, may be separated from a mineral or ore by forming suitable salts, i.e. chlorides, bromides, or other haloid salts, which are then separated by vaporizing these salts at relatively moderate temperatures. One of the most widely accepted techniques is the chlorination of an ore or mineral concentrate. Various chlorination methods have been developed for this purpose. In the practice of such chlorination processes, briquettes or pellets of the ore or mineral concentrate are prepared. These briquettes or pellets are then placed in a furnace and are subjected to contact with gaseous chlorine at an elevated temperature, normally above 500° C. and usually from about 800° C. to about 1200° C. to affect chlorination. The chlorides, now containing the impurity, are vaporized and later condensed in suitable condensation equipment. Typical processes for affecting such chlorination are described in U.S. Pat. Nos. 2,681,855, 3,482,964, 4,612,171 and 4,642,133.

Normal separation techniques, such as chlorination, flotation, or other well known techniques for beneficiating minerals cannot remove impurities contained in the crystal lattice of minerals. Impurities such as arsenic may have found their way in the mineral lattice as the mineral was formed. It is desirable to remove such undesirable impurities to thereby enhance the value of the mineral.

SUMMARY OF THE INVENTION

The present invention provides a process for the removal of undesirable impurities contained in the crystal lattice of minerals. More particularly, the invention relates to the pyro treatment of a mineral to structurally reorganize the mineral and thereby allow an impurity to freely migrate from the crystal lattice during the structural reorganization to combine with a halogen anion. The anion together with the impurity is thereafter readily separable from the mineral, e.g. by leaching, to thus render the mineral essentially free of the impurity.

Numerous minerals will undergo a structural reorganization, i.e. a reorientation of its crystal lattice, under certain temperature and time conditions. It has been discovered that during this change in the mineral's structure an impurity in the crystal lattice, which may be very difficult to remove by common mineral purification techniques, becomes free and available which allows the impurity to be mobile and thus removable. The impurity can freely migrate to other sites within the mineral or externally to combine with an anion intimately mixed with the mineral. It has further been discovered that a matrix-forming additive facilitates the migration of the impurity to the anion.

In accordance with the invention, there is disclosed a process for removing impurities contained in the crystal lattice of minerals, comprising the steps of forming a mixture of a mineral containing an undesirable impurity in its crystal lattice, the mineral capable of structurally changing to reorientate its crystal lattice, a halogen anion, and water; heating the mixture to the mineral's structural reorganization transition temperature; holding the mixture at the transition temperature for a sufficient period of time to allow the impurity to freely migrate from the lattice and combine with the halogen anion; and separating the combined impurity and anion from the mixture to render the mineral essentially free of the impurity. The process is applicable to numerous minerals including most silicates and metal oxides such as fluorspar, spodumene, pyrolusite, braunite, quartz, apatite, bobierrite, evansite, zirconium silicate, feldspars, leurite and anauxite. Also, numerous halogen anions can be employed, such as chlorides, fluorides, bromides and iodides. The preferred halogen anion is a metal chloride such as calcium chloride because it has a relatively high melt temperature and has a high affinity for arsenic. Also, numerous impurities can be removed via the present process such as arsenic and various metal ions such as metal oxides.

Various matrix-forming additives may also be employed with the mixture to facilitate the migration of the impurity from the crystal lattice to the anion. Preferred additives are silicates, added in the form of bentonite, and other clays such as montmorillonite and others of the kaolinite group. It has farther been discovered that a group of organic compounds may also function as the matrix-forming additive. Preferred organic additives include lignosulfonates, starches and starch hydrolyzates.

As noted above, during the mineral's structural reorganization the impurity combines with the anion to form a halogen salt and this salt is separated to render the mineral essentially free of the impurity. The separating step preferably comprises solubilizing the salt by leaching with an acid such as hydrochloric acid. However, other acids such as nitric acid may also be employed, as well as bases such as sodium hydroxide depending upon the mineral and the impurity to be separated.

DESCRIPTION OF THE PREFERRED EMBODIMENT

Figure 1:
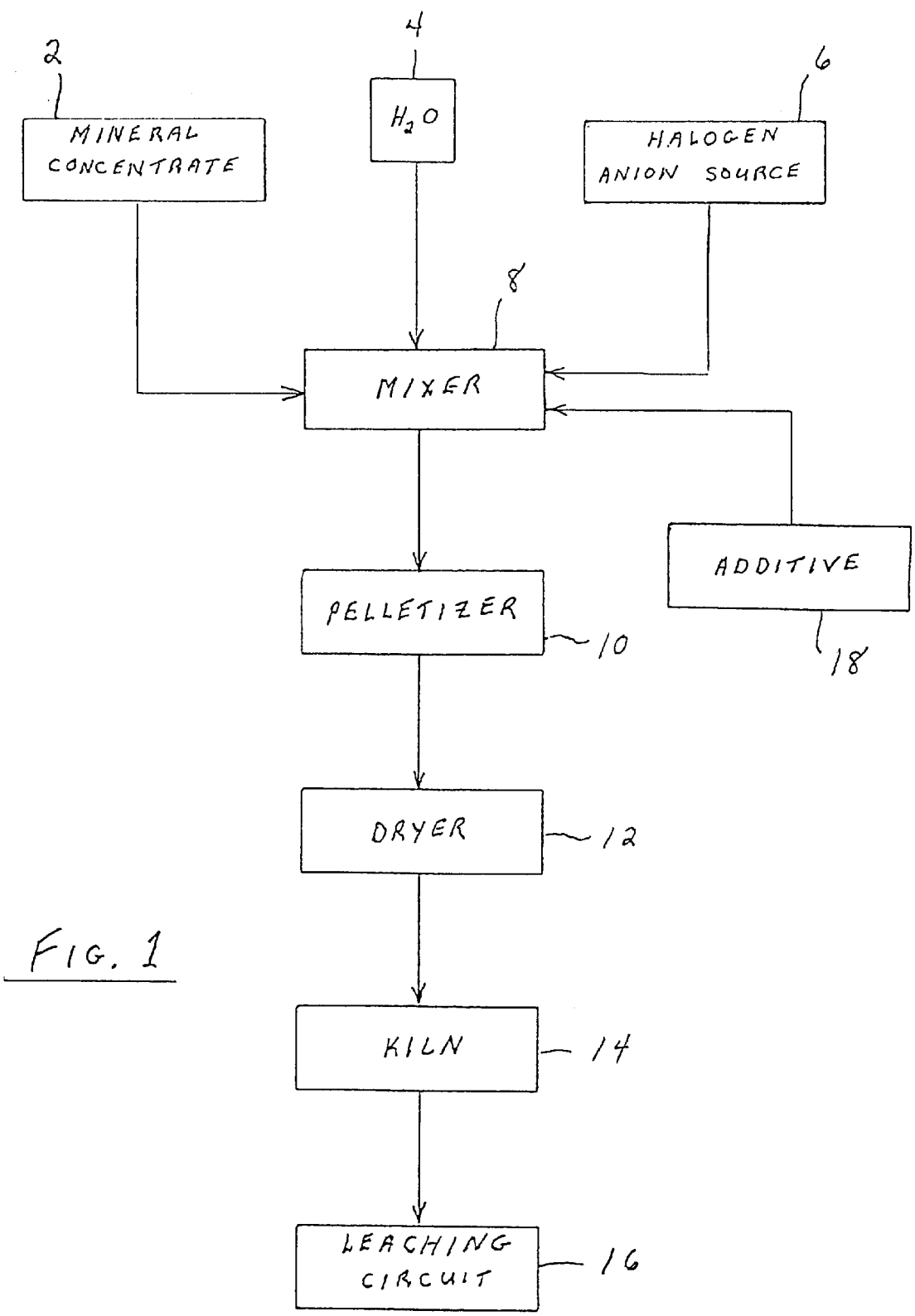
FIG. 1 illustrates a flow diagram of the process of the present invention.

Referring now to the drawings, FIG. 1 illustrates a flow chart describing a preferred process to remove undesirable impurities found in the crystal lattice of minerals to thereby enhance the value of the mineral. As a first step in the process, mineral concentrate represented by 2, water represented by 4 and a halogen anion source represented by 6 are fed to a mixer 8 to form a homogeneous admixture of the three ingredients. Mixer 8 can be of any conventional type commonly employed in the industry to thoroughly and intimately mix these ingredients. Preferably, mixer 8 is a high intensity mixer such as a Littleford type.

The minerals employed in the present process are those capable of structural reorganization. Such minerals, upon heating to a transition temperature, undergo a structural transformation to reorientate their crystal lattice. In many minerals, such transformation is irreversible, but in other minerals the transformation is reversible. Accordingly, the present process is applicable to minerals such as fluorspar (fluorite), spodumene, pyrolusite, braunite, quartz, apatite, bobierrite, evansite, zirconium silicate, feldspars, leucite and anauxite. Fluorspar, or fluorite is a transparent or translucent mineral having the formula $CaF_2$ that consists of calcium fluoride. Spodumene is a lithia aluminosilicate having the theoretical formula $Li_2O.Al_2O_3.4SiO_2$. Pyrolusite is a manganese dioxide having the formula $MnO_2$ that is of an iron-black or dark steel-gray color. Braunite is also a manganese mineral having the formula $Mn_2O_3$ that is brownish black or steel-gray in color. Quartz is a silicon dioxide having the formula $SiO_2$ that is typically colorless and transparent. Apatite may be any of a group of calcium phosphate minerals containing other elements or radicals (as fluorine, chlorine, hydroxyl, or carbonate) having the general formula $Ca_5 (F, Cl, OH, \frac{1}{2}CO_3)(PO_4)_3$ and occurring as the chief constituent of phosphate rock. Bobierrite is a hydrous magnesium phosphate mineral having the formula $Mg_3 (PO_4)_2.8H_2O$. Evansite is an aluminum phosphate mineral having the formula $Al_3(PO_4)(OH)_6 0.6H_2O$. Zirconium silicate occurs in nature as zircon and has the formula $ZrSiO_4$. Feldspar is any of a group of aluminum silicates generally white or nearly white in color and having the general formula $Me(AlSi_3O_8)$ where Me may be lithium, sodium, potassium, calcium or barium. Leucite is a potassium aluminum silicate having the formula $K AlSi_2O_6$ that is typically white or gray in color. Anauxite is a hydrous aluminum silicate having the formula $Al_2Si_3O_7(OH)_4$. As previously mentioned, all of the above minerals undergo a transformation whereby the mineral undergoes a structural reorganization upon heating to reorientate its crystal lattice. Typically, the mixture contains from about 86% to about 96% by weight of the mineral concentrate. All of the above described minerals are well known and are readily available in the industry from numerous sources.

The water employed can be from any source. Only small amounts of water are utilized in the mixture. Typically, from about 2% to about 8% by weight is employed. Preferably, from about 2% to about 4% is utilized so that the mixture may be readily mixed and thereafter transported to pelletizer 10, yet not contain excessive amounts of water. This enables the mixture to be dried in dryer 12 at a relatively low temperature, i.e. from about 200° C. to about 400° C. to conserve energy and its related costs.

The halogen anion source can be any chloride, fluoride, bromide or iodide salt or ester. These anions are typically obtained in the form of salts such as calcium, sodium, potassium, ammonium, magnesium, aluminum, iron and copper salts. The preferred halogen anion is a metal chloride salt, with the most preferred being calcium chloride. The above halogen anions are readily available in the industry from numerous sources. Typically from about 2% to about 6% by weight of halogen anion source is employed with the preferred amount being about 2–4% by weight.

After the mineral concentrate 2, water 4 and halogen anion 6 is thoroughly mixed together, the mixture is fed to a pelletizer 10 where the mixture is agglomerated into small pellets or other discrete shapes for further processing. These discrete shapes may be referred to as pellets, cubes, blocks, wafers, briquettes, crumbles, nuts, and so on. The only requirement being such discrete shapes must be readily processed, transported and acceptable to dryer 12. Accordingly, dryer 12 may be any conventional oven or other equipment which may be utilized to remove water 4 from the "pelletized mixture". Typically, a continuous band type dryer operated at a temperature of about 200° C. to about 400° C. may be employed.

Figure 2:
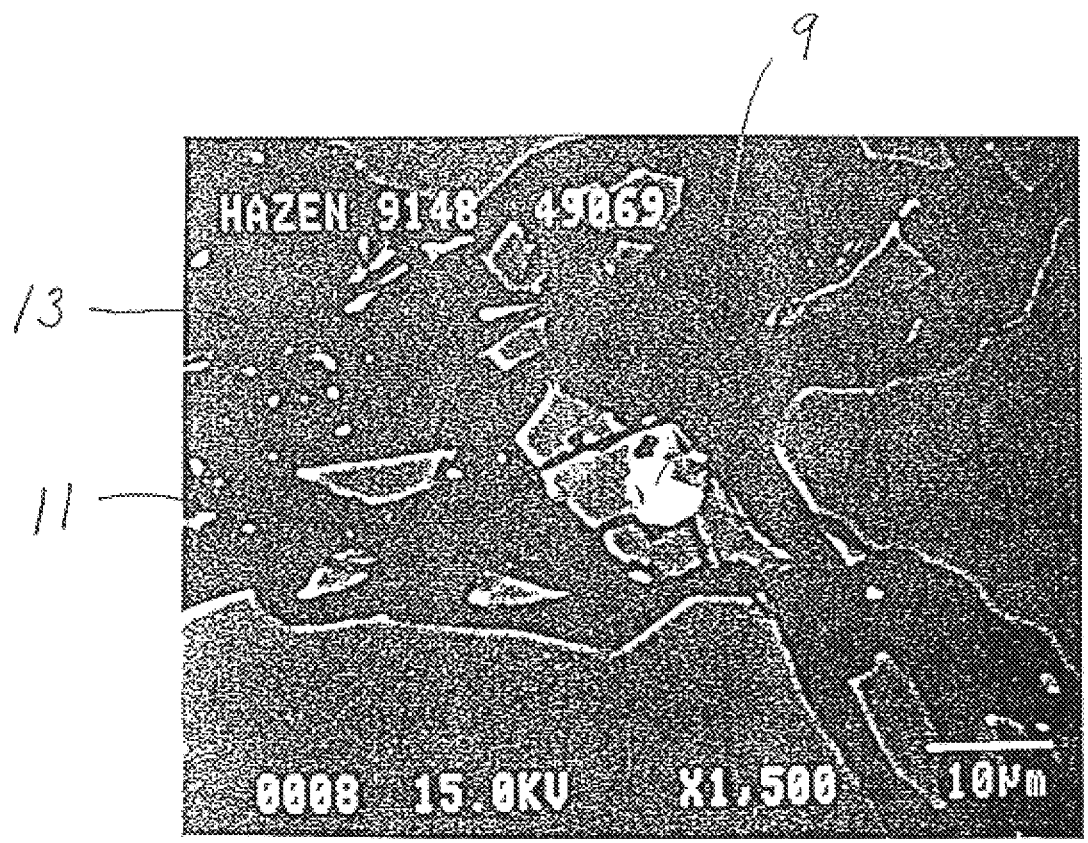
FIG. 2 is a photomicrograph at ×1500 magnification of a polished cross section of a fluorspar particle prior to its structural reorganization.

FIG. 2 illustrates a polished cross section of a fluorspar particle at this stage of the process and prior to its structural reorganization. As depicted, an arsenic particle 9 is encapsulated within a fluorspar particle 11 which in turn is bound by an epoxy matrix 13. As is conventional, epoxy is employed to bind the fluorspar particles 11 together to enable the sectioning and the taking of a photomicrograph. Of particular importance is the sharp angularity of the fluorspar particles 11.

After water from the pelletized mixture is removed in dryer 12, the "pellets" are then fed to a rotary kiln 14 where the temperature of the mixture, i.e. the now dried pellets, is raised to between about 450° C. and about 1200° C. Depending upon the mineral being purified, kiln 14 is employed to heat the mixture containing the mineral to the mineral's structural reorganization transition temperature and to hold the mineral mixture at this temperature so that the mineral undergoes at least partial, but preferably complete structural reorganization. With respect to fluorspar, this mineral structurally reorganizes at approximately 1150° C. to 1190° C., and thus kiln 14 would typically heat the mixture from about 1170° C. to about 1180° C. With respect to spodumene, this mineral undergoes an irreversible structural transformation (from its alpha form to its beta form) upon heating to a temperature of about 500° C. With respect to the mineral pyrolusite, this mineral has a transition temperature of between about 650° C. to about 700° C. With respect to braunite, this mineral has a transition temperature of between about 1150° C. to about 1200° C. Quartz has a transition temperature of between about 530° C. to about 615° C. Apatite has a transition temperature of between about 825° C. to about 875° C. Bobierrite has a transition temperature of between about 675° C. to about 710° C. Evansite has a transition temperature of between about 675° C. to about 710° C. Zirconium silicate has a transition temperature of between about 640° C. to about 720° C. Feldspars have transition temperatures of between about 700° C. to about 900° C. Leucite has a transition temperature of about 620° C. Finally, anauxite has a transition temperature of between about 975° C. to about 1010° C.

The mixture is then retained within kiln 14 and is held therein at the structural transition temperature for a sufficient amount of time for the mineral to at least partially and preferably completely reorganize its crystal structure. This change in the mineral's structure allows any impurity contained in its crystal lattice to become free and available, thus allowing the impurity to be mobile which enables the impurity to freely migrate from the lattice and combine with the halogen anion. Preferably, the "pelletized" mixture is held at the transition temperature for a sufficient amount of time to cause a complete structural reorganization, and depending upon the particular mineral employed this period of time may typically be from about 10 minutes to about 120 minutes, preferably 45 to 75 minutes.

Figure 3:
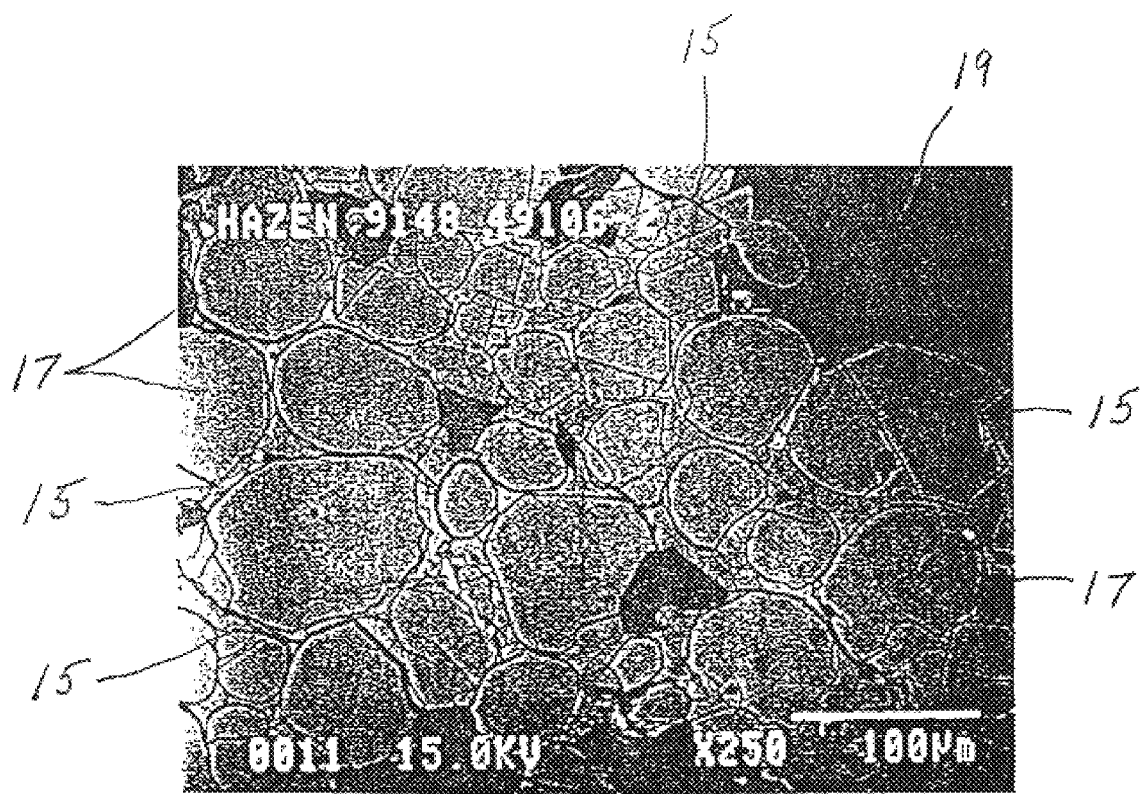
FIG. 3 is a photomicrograph at ×250 magnification of a polished cross section of a fluorspar particle after its structural reorganization.

FIG. 3 illustrates a polished cross section of a fluorspar particle at this stage of the process and subsequent to undergoing structural reorganization. As depicted, arsenic particles 15 are dispersed throughout the lattice of fluorspar particles 17 which, as previously noted, are bound together by an epoxy matrix 19. Of particular importance is the rounded shape of the fluorspar particles 17.

The final step in the process is to remove the combined impurity and anion from the mixture by separating the combined impurity and anion from the mineral. For this purpose, a leaching circuit 16 is employed to thus render the mineral essentially free of the impurity. The leaching circuit 16 utilizes an acid such as hydrochloric acid or nitric acid, or a base such as sodium hydroxide, depending on the impurity and anion, to solubilize the combined impurity and anion. Although leaching is the preferred method for separating the impurity, other methods such as flotation may also be employed.

Figure 4:
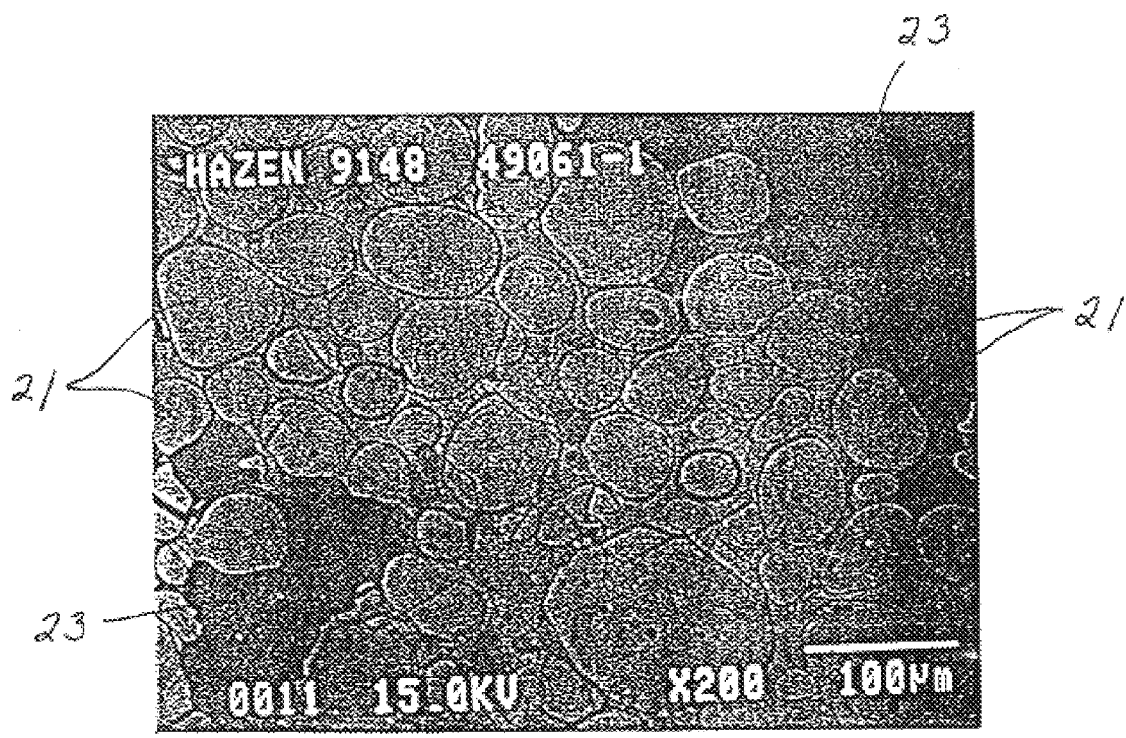
FIG. 4 is a photomicrograph at ×20 magnification similar to FIG. 3 of a fluorspar particle having additionally been subjected to an acid leaching process.

FIG. 4 illustrates a polished cross section of a fluorspar particle at this stage of the process and after leaching. As depicted, there are no detectable arsenic particles dispersed or encapsulated in either the fluorspar particles 21 or the epoxy matrix 23.

The above-described process may be utilized to remove numerous undesirable impurities found in the crystal lattice of minerals. Such impurities include arsenic, antimony and tin, and metals such as nickel and manganese, as well as other cations such as magnesium and potassium. The process performs especially well to remove arsenic from fluorspar when utilizing calcium chloride as the halogen anion and hydrochloric acid in the leaching circuit 16.

Depending upon the particular mineral and the impurity to be removed, a matrix-forming additive represented by 18 may be added to the mixture in mixer 8. The additive 18 is employed to provide a receptor for the impurity to concentrate and combine with the impurity to form a matrix which thereafter immobilizes the impurity so that it can be more easily removed. One especially effective additive has been found to be a silicate, which may be added in the form of bentonite in mixer 8. Other matrix-forming additives include various clays such as montmorillonite and others of the kaolinite group.

It has further been discovered that certain organic compounds may also function as the matrix-forming additive. Preferred organic additives include lignosulfonates, starches and starch hydrolyzates.

As used herein, the term "lignin" has its normal connotation, and refers to the substance which is typically recovered from the organosolve process, or from alkaline black pulping liquors such as are produced in the Kraft, soda, and other well known alkaline pulping operations. The term "sulfonated lignin," as used in this specification, refers to the product which is obtained by the introduction of sulfonic acid groups into the lignin molecule, as may be accomplished by the reaction of lignin with sulfite or bisulfite compounds. For example, the waste liquors from such organosolve or alkaline pulping contain large quantities of lignin and lignin decomposition products, which can be sulfonated or sulfomethylated by known processes, such as high temperature sulfonation, oxidative sulfonation at ambient temperature, or sulfomethylation by reaction of lignin, sodium sulfite and formaldehyde. As used herein, the term "sulfite lignin" refers to the reaction product of lignin, which is inherently obtained during sulfite pulping of wood, straw, corn stalks, bagasse and the like, and is a principle constituent of the spent sulfite liquor which is derived from that process. Finally, the phrase "lignosulfonate" encompasses not only the sulfonated lignin and sulfite lignin reaction products described above, but also spent sulfite liquors that may be further reacted, purified, fractionated, or the like, as may be required to produce the lignosulfonate material of interest. Lignosulfonates are available from numerous sources in either aqueous solution or dried powder forms. For example, LignoTech USA, Inc. sells lignosulfonates under the trade designations Lignosol, Norlig, and Marasperse which are appropriate for use in the present invention.

Lignosulfonates, both of hardwood and softwood origin, may be utilized herein in the "as is" or whole liquor condition as an aqueous solution, or dry and in powder form. For economic reasons, the preferred lignosulfonate for use in the present invention is an unmodified lignosulfonate in salt form selected from a calcium lignosulfonate, an ammonium lignosulfonate, and a sodium lignosulfonate, a magnesium lignosulfonate, a potassium lignosulfonate, a lithium lignosulfonate, and mixtures or blends of such lignosulfonate salts. The preferred salt is calcium lignosulfonate.

Purified forms of the above calcium, ammonium, sodium, magnesium, potassium and/or lithium lignosulfonate salts, i.e. those partially or fully devoid of sugars, referred to herein as sugar-lean or de-sugared, may also be used as the lignosulfonate ingredient of the binder. The terms "sugar-lean" or "de-sugared" are meant to encompass lignosulfonates containing 2% or less of sugars, and preferably 1% or less of sugars. The term "sugars" is meant to include any of various water soluble carbohydrates normally referred to as sugars in this industry and typically contained in lignosulfonates, including but not limited to saccharides such as mono- or di-saccharide sugars like sucrose, manose, arabinose, rhamnos, galactose, glucose, and xylose, as well as polymerized sugars or sugar acids such as gluconic acid, and mono- or di-carboxylic acid decomposition products of the above sugars. Inorganic constituents such as sodium chloride, sodium sulfate, sodium sulfite, and various other ionic species or salts may also be removed if desired.

The sugar-lean lignosulfonate (LS) comprises a processed LS, or a combination of such LS, where all or substantially all of the otherwise existent sugars have been eliminated. The processed lignosulfonate used in the present invention is a de-sugared lignosulfonate (LS), that has been subjected to a mechanical, a physiochemical or a chemical de-sugaring process. Examples of mechanical and physiochemical processes include (i) ultrafiltration where the de-sugared LS is obtained as the retentate after ultrafiltration of LS-bearing liquors, (ii) precipitation followed by filtration where the de-sugared LS is obtained after chemically precipitating the LS and then recovering the LS by filtration, and (iii) various ion exchange chromatography. Chemically de-sugared lignosulfonates may also be used. Methods for chemically de-sugaring lignosulfonate products may include (i) ozone or hydrogen peroxide oxidation, (ii) oxidation under elevated temperatures and pH, and (iii) various fermentation processes, all of which lead to the conversion of sugars to carbon dioxide. Examples of processed lignosulfonates suitable for use herein include Ultrazine CA, Marasperse GNS and Borresperse CA (all manufactured by Borregaard LignoTech) as well as Lignosite 50 (manufactured by Georgia Pacific).

Blends or mixture of the calcium, arnmonium, sodium, magnesium, potassium and lithium lignosulfonates may also be used as the matrix-forming additive. Typically, however, a calcium lignosulfonate additive would be defined as an additive which contains at least 50% by weight calcium lignosulfonate whether unmodified, purified or modified. Likewise, a magnesium lignosulfonate additive is an additive which contains at least 50% by weight unmodified, purified or modified magnesium lignosulfonate. Due to its ready availability and relatively inexpensive cost, the preferred lignosulfonate ingredient of the binder is unmodified calcium lignosulfonate.

The term "starch" as used herein refers to a carbohydrate polymer having the following repeating unit:

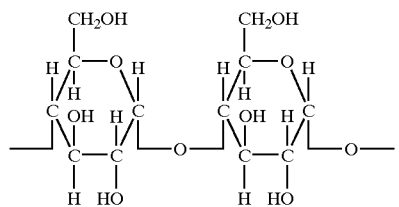

Starch is composed of about 25% arnylose (anhydroglucopyranose units joined by glucosidic bonds) and 75% amylopectin, a branched-chain structure. Starch is a reserve polysaccharide in plants (corn, potatoes, tapioca, rice, and wheat are commercial sources). The most common starches are corn starch and potato starch. The term "starch" also includes modified starch which is defined as any of several water-soluble polymers derived from a starch (e.g. corn, potato, tapioca) by acetylation, chlorination, acid hydrolysis, or enzymatic action. These reactions yield starch acetates, esters, and ethers in the form of stable and fluid solutions and films. Thin-boiling starches have high gel strength, oxidized starches made with sodium hypochlorite have low gelling tendency. Introduction of carboxyl, sulfonate, or sulfate groups into starch gives sodium or ammonium salts of anionic starches, yielding clear, non-gelling dispersions of high viscosity. Cationic starches result from addition of amino groups.

The glucose units of starch can be crosslinked with such agents as formaldehyde, soluble metaphosphates, and epichlorohydrin; this increases viscosity and thickening power.

The term "starch hydrolyzate" refers to an acid and/or enzyme hydrolysis product of starch. Examples of starch hydrolyzates are dextrose, dextrin and starch syrups. Although distinct commercial products, they are described together because they have in common the raw material source, the general method of preparation, and many properties and applications. Dextrose is the common commercial name for the pure, crystalline solid recovered from almost completely hydrolyzed starch. Starch syrups are clear, colorless, viscous liquids representing partially complete hydrolysis of starch consisting of highly concentrated solutions of dextrose, maltose, and higher saccharides. The preferred starch syrup is made from corn starch. Dextrin may be defined as a group of colloidal products formed by the hydrolysis of starches. Industrially, it is made by treatment of various starches with dilute acids or by heating dry starch. The term also includes products resulting from enzyme or acid-catalyzed hydrolysis of wet starch. The yellow or white powder or granules are soluble in boiling water and insoluble in alcohol and ether.

The following examples will serve to demonstrate the advantages and efficacy of the invention. These examples are merely intended for illustration without in any way limiting the scope of the invention.

EXAMPLE 1

This example illustrates, in general, the process of the present invention. First, a mixture of 93% fluorspar, 4% calcium chloride and 2.5% bentonite as solids was formed. The solids so formed were mixed with 10% water. This mixture was then agglomerated into small pellets, and dried at a temperature of about 400° C. to remove the water. The pellets were then fed to a rotary kiln where the temperature was raised to 1175° C. and held at that temperature for approximately 70 minutes. During this time, the fluorspar structurally reorganized and arsenic contained in the crystal lattice of the fluorspar combined with the chloride from the calcium chloride and migrated to the silicate which made the arsenic immobile. Although some of the arsenic was lost in the gas stream from the rotary kiln as $AsCl_3$, the majority of the arsenic remained with the silicate matrix as shown by the data in table 1 below. The arsenic attached to the silicate matrix was then removed by leaching with hydrochloric acid to render the fluorspar essentially free of arsenic.

EXAMPLE 2

In these experiments, various different combinations of bentonite, dextrin, lignosufonate (LS) and calcium chloride were admixed with fluorspar and processed in accordance with Example 1 at various kiln temperatures. The data in Table 1 below illustrates the amount of arsenic freed from the crystal lattice, and further illustrates that the flurospar, after processing by the present method, was essentially free of arsenic.

TABLE 1

SUMMARY OF KILN TESTS

| Test # | Sample Time (Min.) | Agglomerates Size (Inch) Pellet | Extruder | Product (PPM As) Kiln (As) | Lix (As) | Prod. Weight (Lbs) | % Loading | Drying Temp. ° C. | Underbed Underbed (Avg.) ° C. |
|---|---|---|---|---|---|---|---|---|---|
| SSBK-15 | EOP | 6 × 9 MM | | | 57 | 13.995 | 10% | N/A | 1151 |
| | 15 | 2.5% Bent + 6% CaCl2 | | | 26 | | 17.11 lbs | | |
| | 30 | | | | 22 | | Wet feed | | |
| | 45 | | | | 14 | | To kiln | | |
| | 60 | | | | 12 | | | | |
| | 75 | | | | 12 | | | | |
| Prod. WC | 75 min. | | | | 8 | | | | |
| Prod. AC | 75 min. | | | | 8 | | | | |
| SSBK-14 | EOP | 6 × 9 MM | | | 57 | 14.173 | 10 | 177 | 1151 |
| | 15 | 2.5% Bent + 6% CaCl2 | | | 19 | | 15.44 lbs | | |
| | 30 | | | | 16 | | Fedd to kiln | | |
| | 45 | | | | 14 | | (7 KG) | | |

TABLE 1-continued

SUMMARY OF KILN TESTS

| Test # | Sample Time (Min.) | Agglomerates Size Pellet | Agglomerates Size (Inch) Extruder | Product (PPM As) Kiln (As) | Product (PPM As) Lix (As) | Prod. Weight (Lbs) | % Loading | Drying Temp. °C. | Underbed Underbed (Avg.) °C. |
|---|---|---|---|---|---|---|---|---|---|
| | 60 | | | | 12 | | | | |
| | 75 | | | | 8 | | | | |
| Prod. WC 75 min. | | | | | 8 | | | | |
| Prod. AC 75 min. | | | | | 8 | | | | |
| SSBK-13 | EOP | ⅛ × ¼ | | | 46 | 14.35 | 10 | 177 | 1151 |
| | 15 | 2.5% Bent + 6% CaCl2 | | | 19 | | | | |
| | 30 | | | | 18 | | | | |
| | 45 | | | | 17 | | | | |
| | 60 | | | | 15 | | | | |
| | 75 | | | | 12 | | | | |
| Prod. WC 75 min. | | | | | 12/22 | | | | |
| Prod. AC 75 min. | | | | | 12 | | | | |
| SSBK-12 | EOP | ⅛ × ¼ | | | 40 | 12.54 | 10 | 177 | 1042 |
| | 15 | 1.2% Bent + 12% CaCl2 | | | 25 | | | | |
| | 30 | | | | 18 | | | | |
| | 45 | | | | 12 | | | | |
| | 60 | | | | 12 | | | | |
| | 75 | | | | 12 | | | | |
| Prod. WC 75 min. | | | | | 12 | | | | |
| Prod. AC 75 min. | | | | | 7 | | | | |
| SSBK-11 | EOP | ⅛ × ¼ | | | 40 | 15.05 | 10 | 177 | 1157 |
| | 30 | | | | 4/4 | | | | |
| | 45 | | | | 4 | | | | |
| | 60 | | | | 4 | | | | |
| | 75 | | | | 4 | | | | |
| Prod. WC 75 min. | | | | | 4/4 | | | | |
| Prod. AC 75 min. | | | | | 4 | | | | |
| SSBK-10 | EOP | ⅛ × ¼ | | | 39 | 13.58 | 10 | 177 | 1156 |
| | 15 | 1.2% Bent + 6% CaCl2 | | | 11 | | | | |
| | 30 | | | | 9 | | | | |
| | 45 | | | | 9 | | | | |
| | 60 | | | | 9 | | | | |
| | 75 | | | | 9 | | | | |
| Prod. WC 75 min. | | | | | 4 | | | | |
| SSBK-09 | 30 | 6 × 9 mm | | | 8.4/30 | 13.66 | 10 | 177 | 1161 |
| | 45 | 1.2% Bent + 6% CaCl2 | | | 12 | | | | |
| | 75 | | | | 10/12/7.8 | | | | |
| Prod. WC 75 min. | | | | | 12 | | | | |
| Prod. AC 75 min. | | | | 235 | 15 | | | | |
| SSBK-08 | 30 | 6 × 9 mm | | | 27 | 14.41 | 10 | 177 | 1164 |
| | 45 | 1.2% Bent + 4% CaCl2 | | | 20 | | | | |
| | 75 | | | | 16 | | | | |
| Prod. WC 75 min. | | | | | 16 | | | | |
| Prod. AC 75 min. | | | | 232 | 19 | | | | |
| SSBK-07 | 30 | 6 × 9 mm | | | 35 | 14.25 | 10 | 177 | 1166 |
| | 45 | 1.2% Bent + 2% CaCl2 | | | 20 | | | | |
| Prod. WC 75 min. | | | | | 19 | | | | |
| Prod. AC 75 min. | | | | 237 | 18 | | | | |
| SSBK-06 | 15 | 6 × 9 mm | | | 50 | 13.15 | 10 | 177 | 1170 |
| | 30 | 1.2% Bent + 2% CaCl2 | | | 34 | | | | |
| | 45 | | | | 26 | | | | |
| Prod. WC 75 min. | | | | | 22/21/10 | | | | |
| Prod. AC 75 min. | | | | | 0.65/8 | | | | |
| SSBK-05 | EOP | 6 × 9 mm | | | 154 | 13.67 | 10 | 177 | 1170 |
| | 30 | 0.5% Bent + 2% CaCl2 | | | 36 | | | | |
| | 60 | | | | 35 | | | | |
| Prod. WC 75 min. | | | | | 21/11 | | | | |
| Prod. AC 75 min. | | | | | 18/14 | | | | |
| SSBK-04 | EOP | 6 × 9 mm | | | 115 | 14.5 | 10 | 177 | 1167 |
| | 30 | 0.5% Bent + 2% CaCl2 | | | 40/21 | | | | |
| | 60 | | | | 26 | | | | |
| Prod. WC 75 min. | | | | | 24/10/16 | | | | |
| Prod. AC 75 min. | | | | | 24/13/10 | | | | |
| SSBK-3 | EOP | 6 × 9 mm | | | 120 | | 10 | 177 | |
| | 30 | 1.2% Bent + 2% CaCl2 | | | 33 | | | | |
| Prod. WC 75 min. | | | | | 0 | | | | |
| Prod. AC 75 min. | | | | | 29 | | | | |
| SSBK-2 | EOP | 6 × 9 mm | | | 321 | 11 | 10 | 177 | 1000 |
| | 15 | 2% LS + 2% CaCl2 | | | 200 | | | | 1000 |

TABLE 1-continued

SUMMARY OF KILN TESTS

| Test # | Sample Time (Min.) | Agglomerates Size Pellet | Agglomerates Size (Inch) Extruder | Product (PPM As) Kiln (As) | Product (PPM As) Lix (As) | Prod. Weight (Lbs) | % Loading | Drying Temp. ° C. | Underbed Underbed (Avg.) ° C. |
|---|---|---|---|---|---|---|---|---|---|
| | 45 | | | | 280 | | | | 1000 |
| | 15 | | | | 325 | | | | 1100 |
| | Prod. | | | | 31 | | | | 1100 |
| SSBK-1 | 45 | | ¼ | 220 | 10 | | | 177 | 1120 |
| | 90 | | 2% Lignin + 1% CaCl2 | 222 | 10 | | | | 1101 |
| | Prod. | | | 213 | 10 | | | | 1103 |
| 97-24 | EOP | 6 × 9 mm | | | 81 | | | | |
| | 15 | 0.5% LS + 0.75% BENT | | | 20 | | | | |
| | 30 | NOT COATED | | | 19 | | | | |
| | 45 | | | | 14 | | | | |
| | 60 | | | | 14 | | | | |
| | 75 | | | | 14 | | | | |
| | 90 | | | | 14 | | | | |
| Prod. WC 90 Min. | | | | | 4 | | | | |
| Prod. AC 90 Min. | | | | | 8 | | | | |
| 97-23 | 30 | 6 × 9 mm | | | 8? | | | 177 | |
| | 60 | 0.5% LS + 0.75% BENT | | | 18 | | | | |
| | 75 | NOT COATED | | | 16 | | | | |
| Prod. WC 120 Min. | | | | | 11 | | | | |
| Prod. AC 120 Min. | | | | | 9 | | | | |
| 97-22 | EOP | 6 × 9 mm | | | 52 | 38.6 | | 177 | |
| | 30 | 1.2% BENT | | | 20 | | | | |
| | 75 | NOT COATED | | | 8 | | | | |
| Prod. WC 120 Min. | | | | | 4 | | | | |
| Prod. AC 120 Min. | | | | | 3 | | | | |
| 97-21 | EOP | 6 × 9 mm | | 77 | 27 | 42.2 | | 177 | 1150 |
| | 30 | 0.5% LS + 0.75% BENT | | 56 | 9 | | | | 1160 |
| | 75 | NOT COATED | | 50 | 13 | | | | 1160 |
| Prod. AC + ¼" | | | | | 0 | | | | 1158 |
| Prod. AC-3 Mesh | | | | | 4 | | | | 1158 |
| Prod. WC 120 Min. | | | | 55 | 8 | | | | 1158 |
| Prod. AC 120 Min. | | | | 57 | 2 | | | | 1158 |
| 97-20 | EOP | 6 × 9 mm | | | 21 | 46.3 | | 177 | 1136 |
| | 30 | 1% LS + 5% BENT | | | 79 | | | | 1150 |
| | 75 | COATED-LIMESTONE | | | 34 | | | | 1141 |
| Prod. WC 120 Min. | | | | | 17 | | | | 1126 |
| Prod. AC 120 Min. | | | | | 16 | | | | 1126 |
| 97-16 | 75 | 6 × 9 mm | | | 65 | 50.4 | | 190 | 1135 |
| | 90 | 1.22% DEXTRIN | | | 27 | | | | 1140 |
| | 105 | | | | 24 | | | | 1144 |
| | 120 | | | | 23 | | | | 1146 |
| COOLED SAMPLE | | | | | 18 | | | | |
| 97-15 | 75 | 6 × 9 mm | | | 34 | 49.55 | | 190 | 1142 |
| | 90 | 1.22% DEXTRIN | | | 28 | | | | 1145 |
| | 105 | | | | 26 | | | | 1145 |
| | 120 | | | | 21 | | | | 1147 |
| COOLED SAMPLE | | | | | 13 | | | | |
| 97-14 | 75 | | ¼" | | 21 | 42.65 | | 190 | 1142 |
| | 90 | | 1.22% DEXTRIN + CORN STARCH | | 21 | | | | 1159 |
| | 105 | | | | 19 | | | | 1142 |
| | 120 | | | | | | | | 1142 |
| COOLED SAMPLE | | | | | 7 | | | | |
| 97-13 | 75 | 6 × 9 mm | | 70 | 11 | 41.2 | | 190 | 1170 |
| | 90 | 1.22% DEXTRIN | | 88 | 16 | | | | 1177 |
| | 105 | | | 67 | 13 | | | | 1176 |
| | 120 | | | 76 | 10 | | | | 1179 |
| COOLED SAMPLE | | | | 73 | 10 | | | | |
| 97-12 | 75 | | ¼" | 65 | 11 | 44.96 | | 190 | 1181 |
| | 90 | | 1.22% DEXTRIN | 48 | 11 | | | | 1182 |
| | 105 | | | 48 | 7.8 | | | | 1183 |
| | 120 | | | 46 | 9 | | | | 1183 |
| COOLED SAMPLE | | | | 63 | 8.4 | | | | |
| 97-11 | 75 | | ¼" | 110 | 27/27** | 22.8 | 12 | 190 | 1181 |
| | 90 | | 1.22% DEXTRIN | 105 | 24/23** | | | | 1179 |
| | 105 | | | 100 | 16/16** | | | | 1184 |
| | 120 | | | 89 | 18/16** | | | | 1183 |
| COOLED SAMPLE | | | | 92/100*** | 17/15** | | | | |
| 97-10 | 75 | | ⅜" | 47 | 7 | 23.35 | 12 | 190 | 1153 |
| | 90 | | 1.22% DEXTRIN | 47 | 7 | | | | 1181 |

TABLE 1-continued

SUMMARY OF KILN TESTS

| Test # | Sample Time (Min.) | Agglomerates Size (Inch) Pellet | Agglomerates Size (Inch) Extruder | Product (PPM As) Kiln (As) | Product (PPM As) Lix (As) | Prod. Weight (Lbs) | % Loading | Drying Temp. °C. | Underbed Underbed (Avg.) °C. |
|---|---|---|---|---|---|---|---|---|---|
| | 105 | | | 61 | 6 | | | | 1186 |
| | 120 | | | 40 | 6 | | | | 1181 |
| COOLED SAMPLE | | | | 36/50*** | 5 | | | | |
| 97-09 | 75 | | ⅜" | 29 | 8 | 40.3 | | 200 | 1161 |
| | 90 | | 1.22% DEXTRIN | 35 | 8 | | | | 1157 |
| | 105 | | | 37 | 8 | | | | 1158 |
| | 120 | | | 42 | 8 | | | | 1159 |
| 97-08 | 75 | | ⅜" | 23 | 10 | 37.9 | | 260 | 1162 |
| | 90 | | 2% DEXTRIN | 24 | 6 | | | | 1162 |
| | 105 | | | 25 | 6 | | | | 1161 |
| | 120 | | | 31 | 6 | | | | 1161 |
| 97-07 | 75 | | ⅜" | 22 | 6 | 46.5 | | 260 | 1173 |
| | 90 | | 2% BENTONITE | 22 | 6 | | | | 1171 |
| | 105 | | | 19 | 5 | | | | 1170 |
| | 120 | | | 12 | 4 | | | | 1168 |
| 07-06 | 75 | | ⅜" | 22 | 9 | 44.8 | | 400 | 1182 |
| | 90 | | 2% BENTONITE | 20 | 8 | | | | 1172 |
| | 105 | | | 20 | 8 | | | | 1173 |
| | 120 | | | 15 | 5 | | | | 1173 |

We claim:

1. A process for removing impurities contained in the crystal lattice in minerals, comprising the steps of:
    forming a mixture of a mineral capable of structurally reorganizing its crystal lattice which contains an impurity in its crystal lattice, a halogen anion, water and a matrix-forming additive to facilitate the migration of the impurity from said crystal lattice, said matrix-forming additive is selected from the group consisting of a silicate, a kaolinite clay, a lignosulfonate, a starch and a starch hydrolyzate;
    heating the mixture to at least the structural reorganization transition temperature of said mineral;
    holding the mixture at the structural reorganization transition temperature for a sufficient amount of time to freely migrate the impurity from the crystal lattice and combine with the halogen anion and matrix-forming additive; and
    separating the combined impurity, matrix-forming additive and anion from said mixture to render the mineral essentially free of said impurity.

2. The method of claim 1 wherein said mineral is selected from the group consisting of fluorspar, spodumene, pyrolusite, braunite, quartz, apatite, bobierrite, evansite, zirconium silicate, feldspars, leucite and anauxite.

3. The method of claim 1 wherein said halogen anion is selected from the group consisting of chlorides, fluorides, bromides and iodides.

4. The method of claim 1 wherein said halogen anion is a metal chloride.

5. The method of claim 4 wherein said metal chloride comprises calcium chloride.

6. The method of claim 1 wherein the structural reorganization transition temperature is between about 450° C. and about 1200° C.

7. The method of claim 1 wherein impurity is selected from the group consisting of arsenic, antimony, tin, nickel, manganese, magnesium cations and potassium cations.

8. The method of claim 1 wherein the step of separating comprises solubilizing the combined impurity and anion.

9. The method of claim 8 wherein the step of solubilizing comprises leaching with an acid.

10. The method of claim 9 wherein said acid is hydrochloric acid.

11. The method of claim 8 wherein the step of solubilizing comprises leaching with a base.

12. The method of claim 11 wherein said base is sodium hydroxide.

13. The method of claim 1 further including the steps agglomerating the mixture into a discreet shape, and drying the agglomerated mixture to remove substantially all water prior to heating the mixture to said structural reorganization transition temperature.

14. The method of claim 1 wherein said silicate is added in the form of bentonite.

15. The method of claim 1 wherein said lignosulfonate is selected from the group consisting of ammonium lignosulfonate, sodium lignosulfonate, magnesium lignosulfonate, potassium lignosulfonate, lithium lignosulfonate, and mixtures thereof.

16. The method of claim 1 wherein said lignosulfonate is selected from the group consisting of a sulfonated lignin, a sulfite lignin, and mixtures thereof.

17. The method of claim 1 wherein said starch is selected from the group consisting of corn starch, potato starch, tapioca starch, rice starch and wheat starch.

18. The method of claim 1 wherein said starch hydrolyzate is selected from the group consisting of dextrose, dextrin and starch syrups.

19. The method of claim 1 wherein said mixture comprises from about 86% to about 96% by weight of said mineral, from about 2% to about 6% by weight of a source of said halogen anion, from about 2% to about 8% by weight of said water, and from about 0.5% to about 2.5% by weight of said matrix-forming additive.

20. The method of claim 1 wherein said mixture comprises from about 86% to about 96% by weight of said mineral, from about 2% to about 4% by weight of a source of said halogen anion, from about 2% to about 4% by weight of said water, and from about 1.2% to about 2.5% by weight of said matrix-forming additive.

21. The method of claim 1 wherein said halogen anion comprises a chloride anion.

22. The method of claim 1 wherein said mixture includes about 2.5% by weight of bentonite as the matrix-forming additive and about 6% by weight calcium chloride as a source of said halogen anion.

* * * * *